Patented Feb. 8, 1938

2,107,937

UNITED STATES PATENT OFFICE 2,107,937

METHOD OF MAKING STORAGE BATTERY PLATES

Clarence A. Hall, Philadelphia, Pa., assignor to The Electric Storage Battery Company, Philadelphia, Pa., a corporation of New Jersey No Drawing. Application May 29, 1935, Serial No. 24,082

2 Claims. (Cl. 136—27)

It has been proposed in the past to mix with the active material or material to become active of a storage battery plate fibrous materials of various kinds for the purpose of holding the material together and in order to avoid scaling or disintegration thereof in service. Glass wool has been suggested but attempts to use it have been unsuccessful. I have found that in attempting to mix ordinary commercial glass wool of 25 to 30 microns diameter, it broke up into very short lengths. The lengths were too short in proportion to the diameter to function properly as a binding agent. Fibers of greater lengths could not be properly applied to the grid because the glass fibers projected beyond the surface of the plate and in some cases overlapped the bars of the grid, making it impossible to provide a smooth finish. Furthermore, the projecting fibers inflicted injury to the hands of workmen. On account of the large diameter of the glass fibers, they displaced more active material than was desirable. Hitherto the glass wool was cut into short lengths commensurate with the space between the bars of the grid, and these short lengths were mixed with the lead oxides in a dry state. The result was that the glass was broken up into small particles of sandy structure, thereby losing its binding effect.

Objects of the present invention are to avoid the above-mentioned defects and disadvantages and to bind the active material together with glass fiber in such a way that the plates shall present smooth surfaces and shall be devoid of sandy particles of glass and shall be satisfactorily bound by uniformly distributed fibers, displacing a limited quantity of active material.

In explanation of the difference between the so-called glass silk which I employ in carrying out this invention and the commercial glass wool heretofore unsuccessfully tried, it may be stated that the minimum diameter of the glass wool fibers is many times the maximum diameter of the glass silk fibers.

This invention is based on the discovery that, by using glass wool of the order of from 5 to 6 microns in diameter and by introducing it in long lengths, illustratively measured in feet, it is possible to uniformly distribute fibers of which the ratio of length to diameter is increased in the order of many times that formerly obtainable. The invention is based on the further discovery that, by introducing such long lengths of small diameter glass fibers into a soupy water mixture of lead oxides, whereby the fibers are wet with water, and then adding sulphuric acid which stiffens the paste, the production of sandy glass particles is avoided, and the glass fibers of small but substantial length are uniformly incorporated and the surface of the plate after the completion of the pasting operation is practically as smooth as that of a plate containing no glass wool.

Based on the above discoveries the invention, generally stated, consists of a storage battery plate of the lead acid type having a smooth surface finish and substantially devoid of glass dust or sand, and comprising a grid and a paste substantially filling the pockets of the grid and consisting of a uniform mixture of active material or material to become active and of a small percentage by weight of glass fibers of the order of 4 to 6 microns in diameter and of a length commensurate with the dimensions of the pockets in the grid.

The invention also consists in introducing glass fibers into the active material or material to become active by primarily making a water paste of lead oxides of soupy consistency, mixing with said paste glass fibers in long lengths many times the dimensions of the pockets of the grid and, while the fibers are water wet, adding to the paste a solution of sulphuric acid and water, which stiffens the paste, and, by stirring, uniformly distributing the fibers and breaking them up, without substantial formation of sandy particles, into lengths suitable for pasting the grids.

The invention also comprises the improvements to be presently described and finally claimed.

A plate embodying features of the invention looks like a standard plate. It has a smooth finish and can be handled like an ordinary plate because it is devoid of needle-like projecting fibers. It can be pasted without pulling off paste because the fibers are reduced to proper length in the described mixing operation. The fibers are well distributed throughout the paste in the pockets of the grid. The capacity of the plate is not reduced but rather is increased as are also durability and cohesion. More important than all, the active material is not dislodged in service. The improvement is particularly marked in the initial formation of the plates, where in the case of previous attempts to use glass fibers scaling occurred, whereas in the case of this invention no scaling occurred under the same conditions of forming schedule.

In the practice of the invention use is made of glass wool fiber of the order of from 5 to 6 microns in diameter and of considerable length even measurable in feet. Such glass fibers are introduced in their full length into a primarily made mixture or paste of lead oxide material and water, of soupy consistency, by mixing the fibers into this paste. The fibers become wet with water and partly separated. There is then introduced into the paste containing the fibers a solution of sulphuric acid in water, for example a specific gravity of approximately 1.400. The effect of this is to stiffen the paste into a dough-like consistency. The acid is added while the mixture is being stirred and the subsequent stirring and gradual stiffening in a few minutes breaks up the long fibers of glass into lengths suitable for pasting the grids and practically no sandy material is produced from the fibers. An example of the length into which the fibers are broken by this operation is an eighth (1/8) of an inch more or less. The proportion of glass fibers to lead oxide material is subject to some variation, but I have had good results by using 1% by weight of glass fibers.

The length of the glass fibers in the final product is determined by the time of mixing after the sulphuric acid has been added to the paste. The longer this mixing is continued, the shorter will be the fibers. The control of this mixing time is therefore an important feature of the process.

It will be obvious to those skilled in the art to which the invention relates that modifications may be made in details of construction and arrangement in matters of mere form without departing from the spirit of the invention which is not limited in respect to such matters or otherwise than as the prior art and the appended claims may require.

I claim:—

1. In the method of introducing glass fibers into the lead oxide material of storage battery plates the improvement which consists in primarily making a water paste of lead oxide of soupy consistency, mixing with said paste glass wool fibers of comparatively long lengths by stirring and while the fibers are water wet and while the paste is being stirred adding gradually to the paste a solution of sulphuric acid and water which stiffens the paste, and continuing the stirring to break up the long fibers without substantial formation of fine particles of glass into lengths suitable for pasting the grids.

2. In the method of introducing glass fibers into the lead oxide material of storage battery plates the improvement which consists in primarily making a water paste of lead oxide of soupy consistency, mixing with said paste glass wool fibers of comparatively long lengths by stirring and while the fibers are water wet and while the paste is being stirred adding gradually to the paste a solution of sulphuric acid and water which stiffens the paste, and continuing the stirring for a sufficient time to break up the long fibers to any shorter lengths that may be desired.

CLARENCE A. HALL.